(12) United States Patent
Sun et al.

(10) Patent No.: US 9,494,770 B2
(45) Date of Patent: Nov. 15, 2016

(54) IMAGING LENS AND IMAGING APPARATUS EQUIPPED WITH THE SAME

(71) Applicant: FUJIFILM CORPORATION, Tokyo (JP)

(72) Inventors: Ping Sun, Saitama-Ken (JP); Katsuhisa Tsutsumi, Saitama-Ken (JP); Michio Cho, Saitama-Ken (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

(21) Appl. No.: 14/627,149

(22) Filed: Feb. 20, 2015

(65) Prior Publication Data

US 2015/0168693 A1    Jun. 18, 2015

Related U.S. Application Data

(63) Continuation of application No. PCT/JP2013/004894, filed on Aug. 19, 2013.

(30) Foreign Application Priority Data

Aug. 24, 2012    (JP) .................................. 2012-184980

(51) Int. Cl.
    *G02B 9/04*    (2006.01)
    *G02B 9/62*    (2006.01)
    *G02B 9/64*    (2006.01)
    *G02B 13/04*    (2006.01)
    *G02B 13/00*    (2006.01)

(52) U.S. Cl.
    CPC ................. *G02B 13/04* (2013.01); *G02B 9/04* (2013.01); *G02B 9/62* (2013.01); *G02B 9/64* (2013.01); *G02B 13/0045* (2013.01)

(58) Field of Classification Search
    CPC ........... G02B 9/04; G02B 9/64; G02B 13/04
    USPC ................ 359/793, 749–754, 717, 733, 725, 359/649–651
    See application file for complete search history.

(56) References Cited

U.S. PATENT DOCUMENTS

| 4,025,170 A | 5/1977 | Kawamura |
| 5,477,389 A | 12/1995 | Ito et al. |
| 5,666,228 A * | 9/1997 | Yamamoto ........... G02B 15/161 359/651 |

(Continued)

FOREIGN PATENT DOCUMENTS

| CN | 1755412 | 4/2006 |
| JP | 44-17959 | 8/1969 |

(Continued)

OTHER PUBLICATIONS

International Search Report—PCT/JP2013/004894—Dec. 10, 2013.

(Continued)

*Primary Examiner* — Thomas K Pham
*Assistant Examiner* — Mitchell Oestreich
(74) *Attorney, Agent, or Firm* — Young & Thompson

(57) ABSTRACT

An imaging lens consists of a front group and a rear group. The front group is composed of a lens having a negative meniscus shape with a convex surface on the object side, a negative lens, a negative lens, and a positive lens in order from the object side. The rear group is composed of a positive lens, a negative lens, a positive lens, and a positive lens in order from the object side. The imaging lens satisfies given conditional expressions.

10 Claims, 11 Drawing Sheets

EXAMPLE 1

(56) References Cited

U.S. PATENT DOCUMENTS

| | | |
|---|---|---|
| 5,724,195 A | 3/1998 | Enomoto et al. |
| 2006/0077565 A1 | 4/2006 | Tomioka |
| 2010/0079874 A1 | 4/2010 | Kamei |

FOREIGN PATENT DOCUMENTS

| | | |
|---|---|---|
| JP | S51-47426 | 4/1976 |
| JP | S59-216114 | 12/1984 |
| JP | S63-17421 | 1/1988 |
| JP | H07-3503 | 1/1995 |
| JP | H07-63986 | 3/1995 |
| JP | H09-96759 | 4/1997 |
| JP | H09-127413 | 5/1997 |
| JP | 2004-102162 | 4/2004 |
| JP | 2004-126522 | 4/2004 |
| JP | 2010-85849 | 4/2010 |

OTHER PUBLICATIONS

Chinese Official Action—2013800438819—Apr. 27, 2016.

* cited by examiner

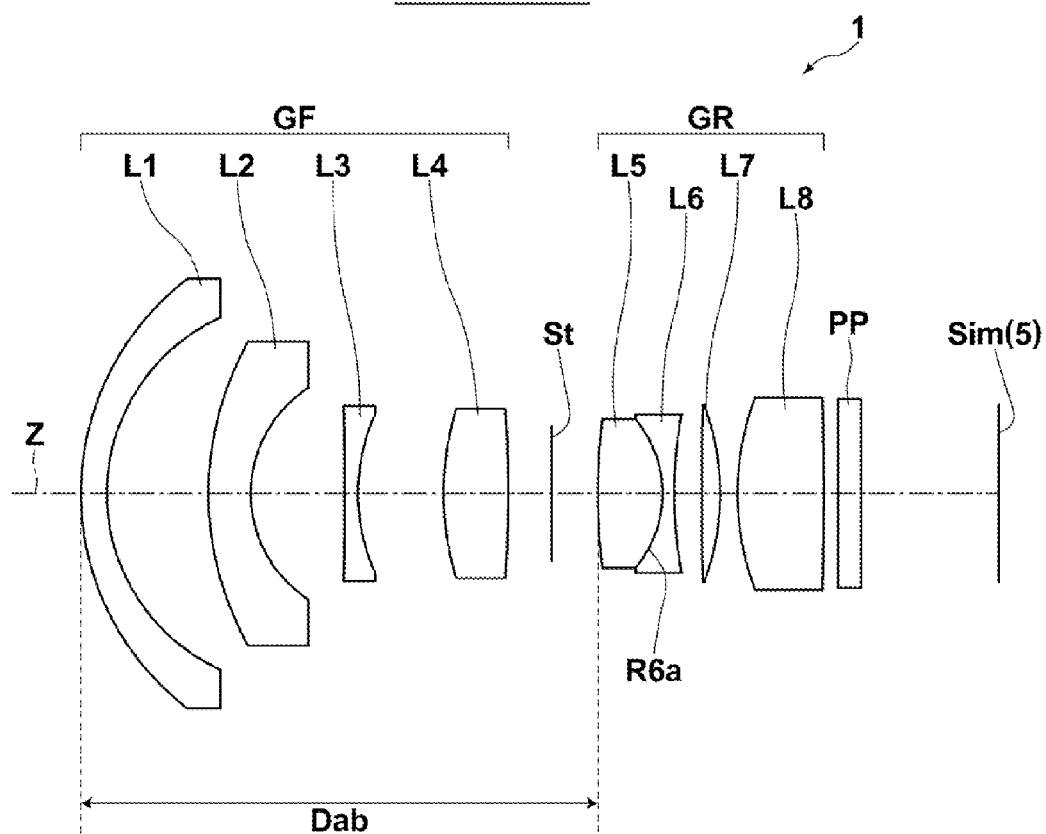

FIG.2  EXAMPLE 2
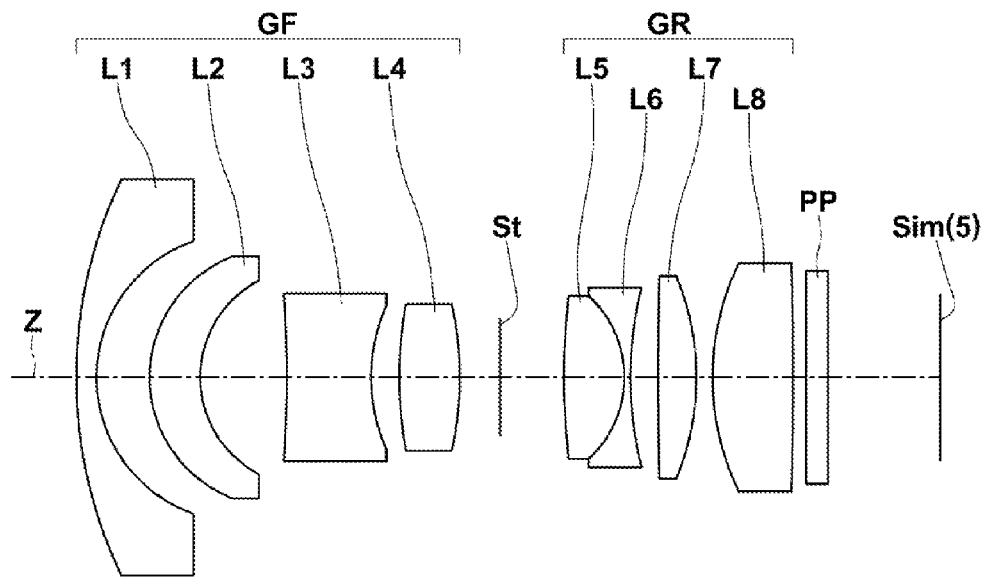
FIG.3  EXAMPLE 3
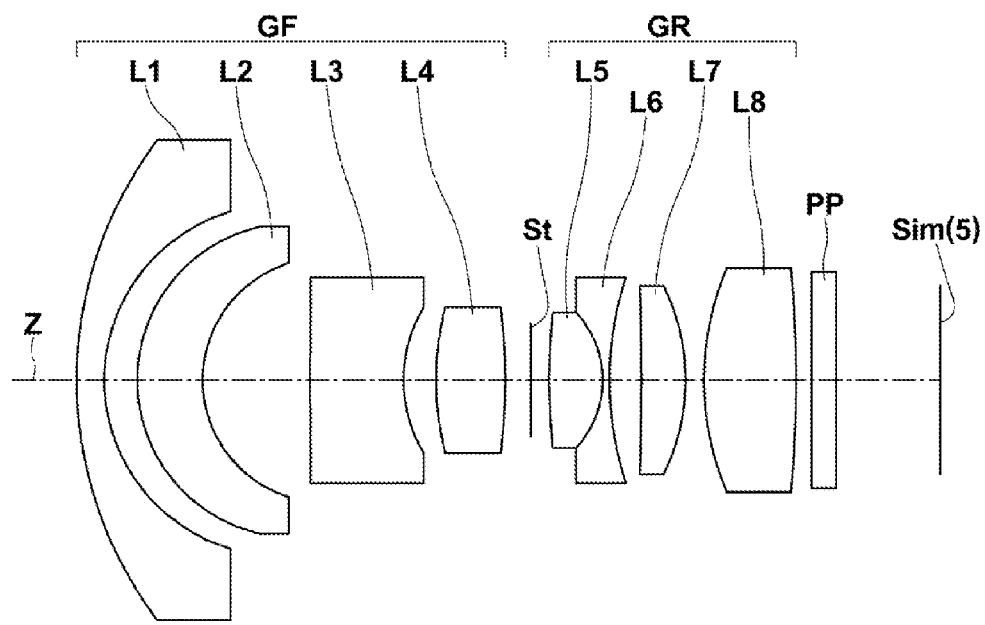

FIG.4 EXAMPLE 4
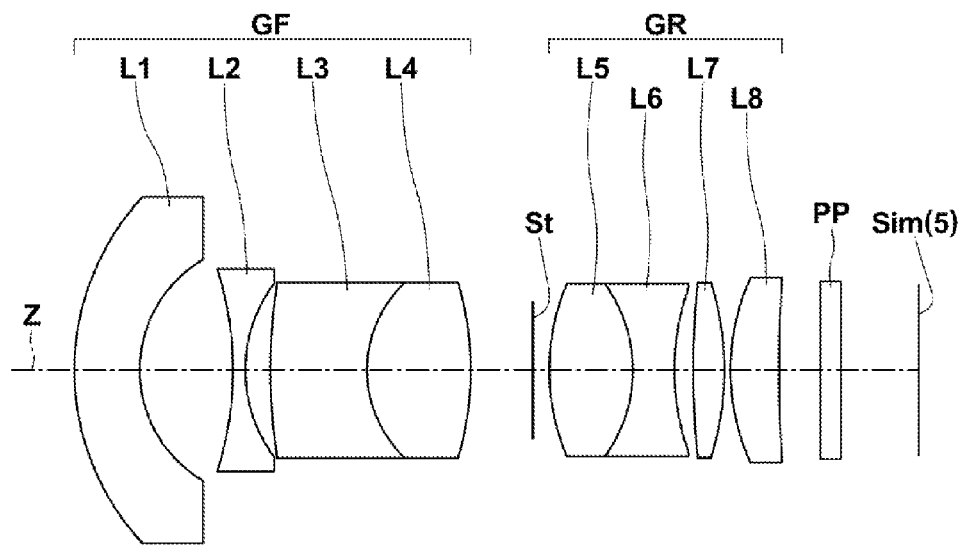
FIG.5 EXAMPLE 5
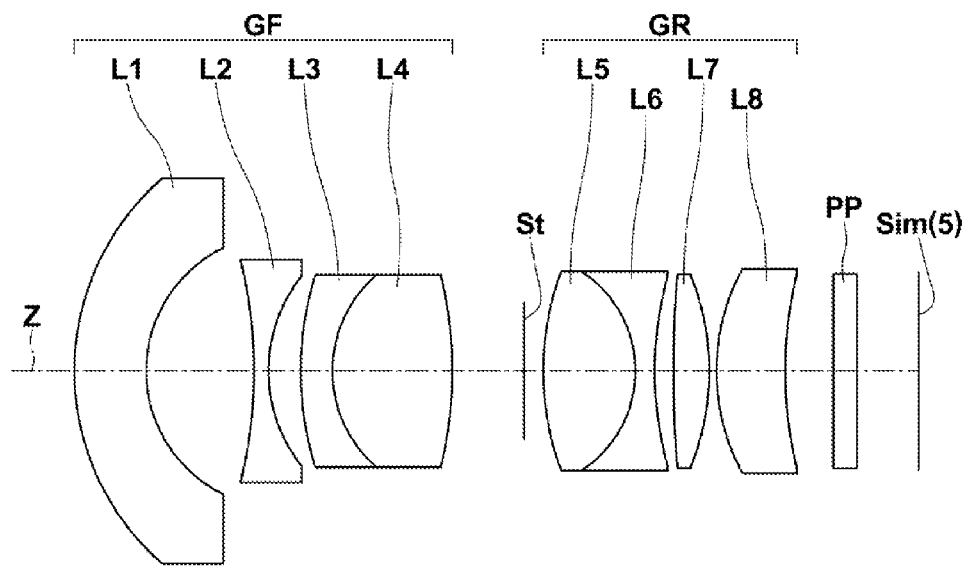

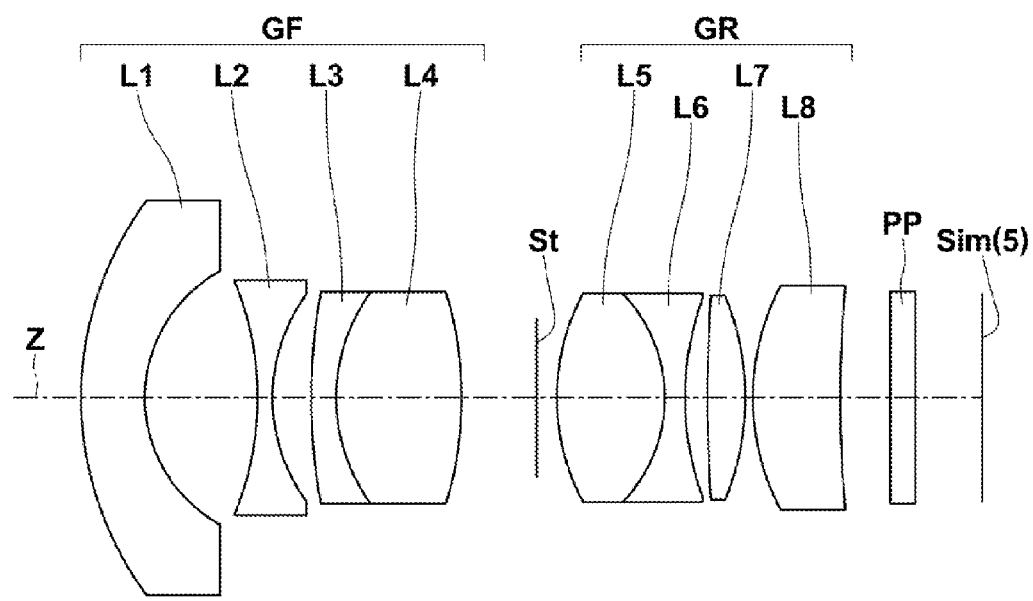
FIG.6  EXAMPLE 6

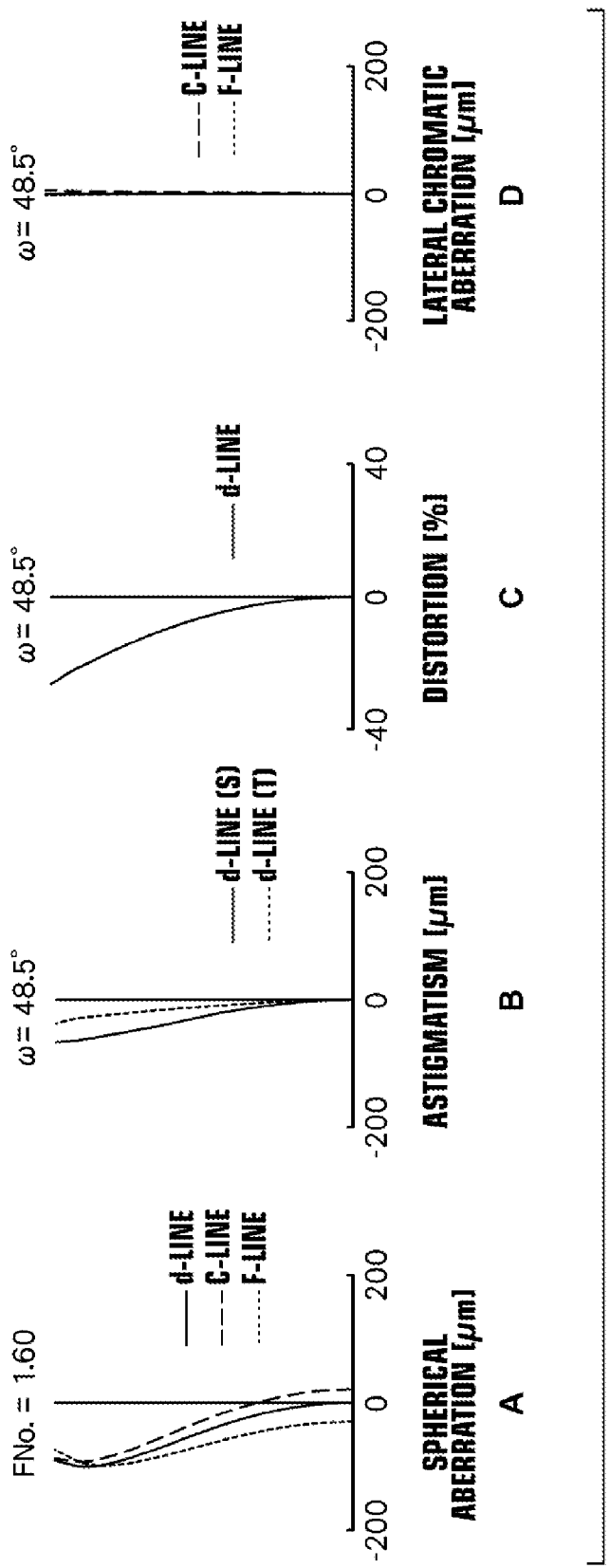

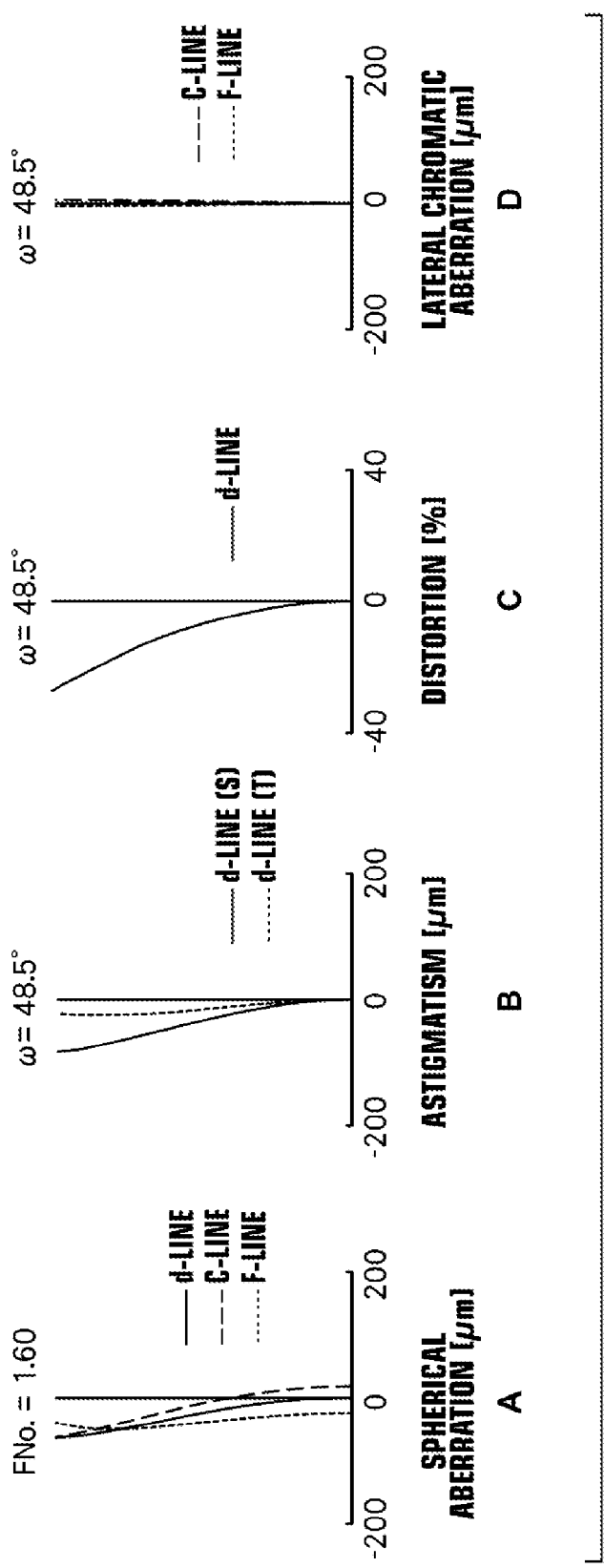
FIG.8 EXAMPLE 2

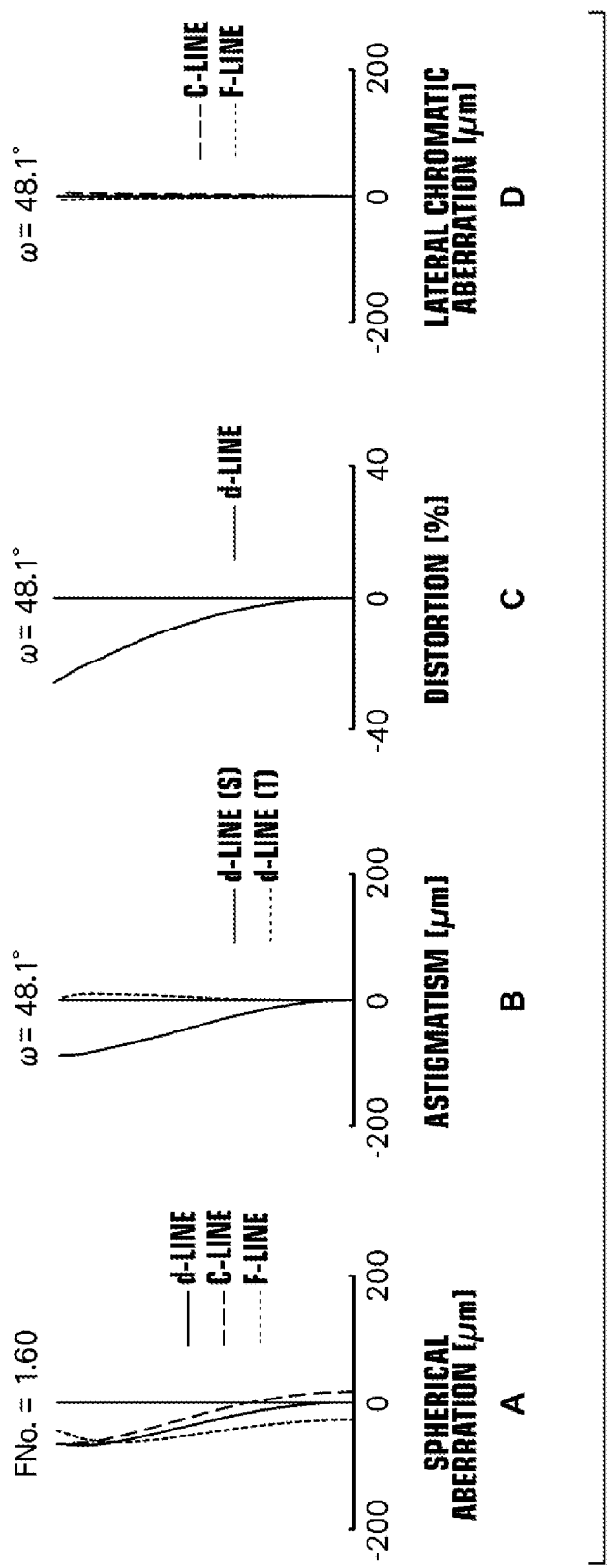

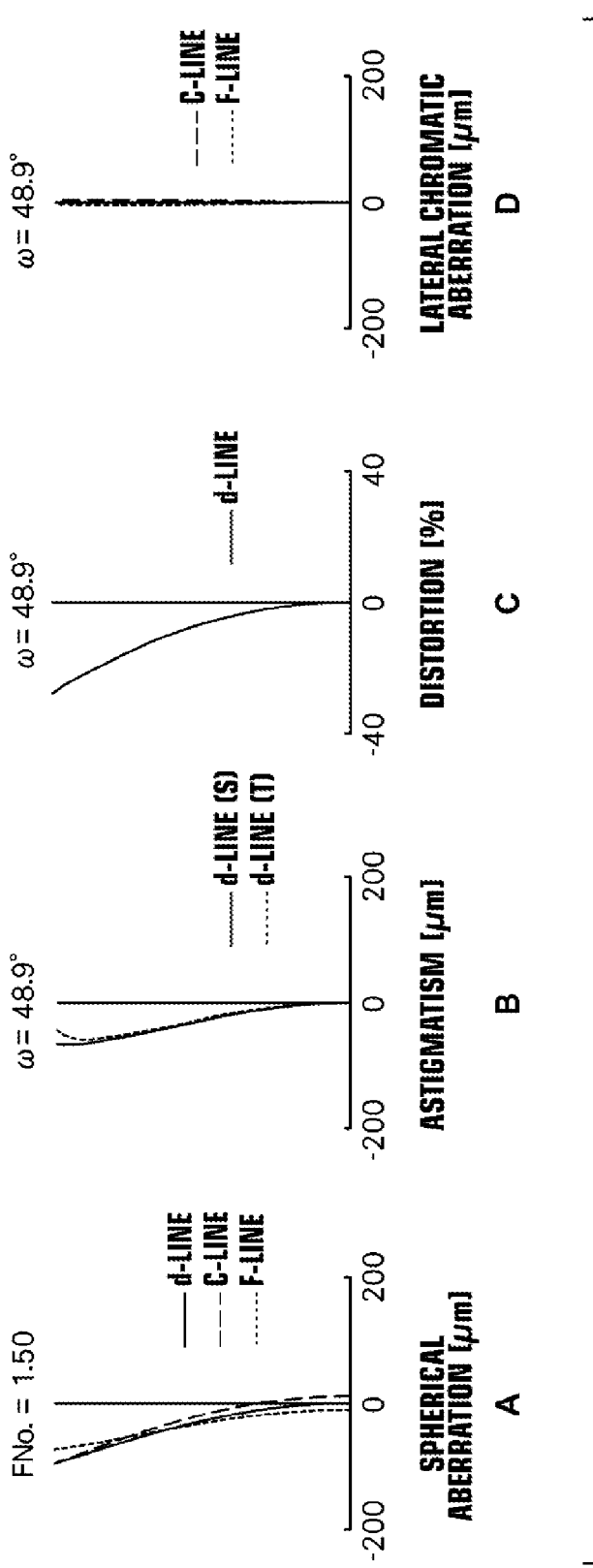
FIG.10 EXAMPLE 4

IMAGING LENS AND IMAGING APPARATUS EQUIPPED WITH THE SAME

CROSS-REFERENCE TO RELATED APPLICATIONS

This application is a Continuation of PCT International Application No. PCT/JP2013/004894 filed on Aug. 19, 2013, which claims priority under 35 U.S.C. §119 (a) to Japanese Patent Application No. 2012-184980 filed on Aug. 24, 2012. Each of the above applications is hereby expressly incorporated by reference, in its entirety, into the present application.

TECHNICAL FIELD

The present invention relates to an imaging lens and an imaging apparatus equipped with the same, and more specifically to an imaging lens that can be used appropriately, for example, with digital cameras, broadcasting cameras, surveillance cameras, and vehicle cameras, and an imaging apparatus equipped with the imaging lens.

BACKGROUND ART

Heretofore, many wide angle lens systems which are applicable to the cameras in the foregoing fields and can be used in combination with solid-state image sensors have been proposed. Among them, as lens systems with eight to nine constituent lenses, those described, for example, in Japanese Examined Patent Publication No. 7(1995)-003503, Japanese Unexamined Patent Publication No. 7(1995)-063986, Japanese Unexamined Patent Publication No. 9(1997)-127413, Japanese Unexamined Patent Publication No. 2004-102162, Japanese Unexamined Patent Publication No. 2004-126522, and Japanese Unexamined Patent Publication No. 2010-085849 may be cited.

DISCLOSURE OF THE INVENTION

Imaging lenses used with surveillance cameras, vehicle cameras, and the like are required to have a wide angle of view, yet with a small F-number. Along with the advancement in compactness and high pixilation of solid-state image sensors, imaging lenses are also required to be compact and have high performance. Recently, lens systems that simultaneously satisfy wide angle of view, small F-number, compactness, and high performance have been demanded and the level of the requirements is getting severe year after year.

The present invention has been developed in view of the circumstances described above, and it is an object of the present invention to provide an imaging lens formed compact, yet having a small F-number, a wide angle of view, and favorable optical performance. It is a further object of the present invention to provide an imaging apparatus equipped with the imaging lens.

An imaging lens of the present invention is an imaging lens, consisting essentially of a front group and a rear group in order from the object side, in which the front group is composed essentially of a negative meniscus lens with a convex surface on the object side, a negative lens, a negative lens, and a positive lens in order from the object side, the rear group is composed essentially of a positive lens, a negative lens, a positive lens, and a positive lens in order from the object side, and the imaging lens satisfies a conditional expression (1) given below:

$$0.42 < f/f2 < 1.0 \tag{1}$$

where f: focal length of the entire system, and
f2: focal length of the rear group.

The imaging lens of the present invention preferably satisfies a conditional expression (1') given below and more preferably satisfies a conditional expression (1") given below:

$$0.45 < f/f2 < 1.0 \tag{1'}$$

$$0.5 < f/f2 < 0.8 \tag{1"}$$

Further, the imaging lens of the present invention preferably satisfies a conditional expression (2) given below and more preferably satisfies a conditional expression (2') given below:

$$0.3 < |R6a/f| < 1.6 \tag{2}$$

$$0.8 < |R6a/f| < 1.5 \tag{2'}$$

where

R6a: radius of curvature of the object side surface of the negative lens in the rear group.

Still further, in the imaging lens of the present invention, a stop is preferably provided between the front group and the rear group. If that is the case, the imaging lens preferably satisfies a conditional expression (3) given below, and more preferably satisfies a conditional expression (3') given below:

$$1.0 < Dab/f < 5.1 \tag{3}$$

$$3.0 < Dab/f < 4.9 \tag{3'}$$

where

Dab: distance on the optical axis between the most object side lens surface in the front group to the most object side lens surface in the rear group.

Further, the imaging lens of the present invention preferably satisfies a conditional expression (4) given below and more preferably satisfies a conditional expression (4') given below:

$$-0.065 < f/f1 < 0.10 \tag{4}$$

$$-0.02 < f/f1 < 0.02 \tag{4'}$$

where f1: focal length of the front group.

The foregoing "essentially" in the context of "consisting essentially of" intends that the imaging lens may include but not limited to a lens having substantially no refractive power, an optical element other than a lens, such as a stop, a cover glass, a filter, and the like, a lens flange, a lens barrel, an image sensor, and a mechanical component, such as a camera shake correction mechanism, in addition to the constituent elements described above.

The signs of refractive powers, surface shapes, and radii of curvature of the lenses of the imaging lens of the present invention are considered in the paraxial region for those having an aspherical surface.

An imaging apparatus of the present invention is equipped with the imaging lens of the present invention.

According to the present invention, in an eight lens system composed of a front group and a rear group disposed in order from the object side, the power arrangement of the eight lenses and the shape of the most object side lens are set appropriately to satisfy given conditional expressions. This allows an imaging lens formed compact, yet having a small F-number, a wide angle of view, and favorable optical performance to be provided, as well as an imaging apparatus equipped with the imaging lens.

BRIEF DESCRIPTION OF DRAWINGS

FIG. 1 is a cross-sectional view of an imaging lens of Example 1 of the present invention, illustrating the configuration thereof.

FIG. 2 is a cross-sectional view of an imaging lens of Example 2 of the present invention, illustrating the configuration thereof.

FIG. 3 is a cross-sectional view of an imaging lens of Example 3 of the present invention, illustrating the configuration thereof.

FIG. 4 is a cross-sectional view of an imaging lens of Example 4 of the present invention, illustrating the configuration thereof.

FIG. 5 is a cross-sectional view of an imaging lens of Example 5 of the present invention, illustrating the configuration thereof.

FIG. 6 is a cross-sectional view of an imaging lens of Example 6 of the present invention, illustrating the configuration thereof.

A to D of FIG. 7 are respective aberration diagrams of the imaging lens of Example 1.

A to D of FIG. 8 are respective aberration diagrams of the imaging lens of Example 2.

A to D of FIG. 9 are respective aberration diagrams of the imaging lens of Example 3.

A to D of FIG. 10 are respective aberration diagrams of the imaging lens of Example 4.

Figure 11:
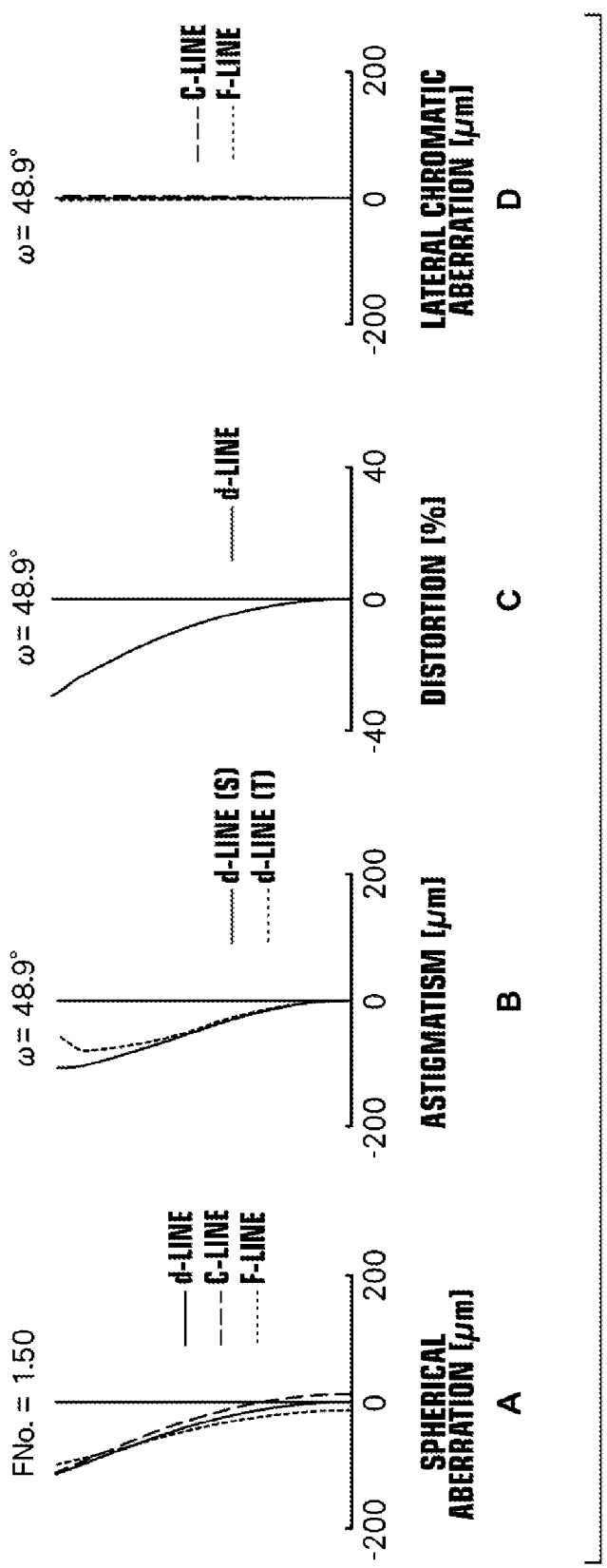

A to D of FIG. 11 are respective aberration diagrams of the imaging lens of Example 5.

Figure 12:
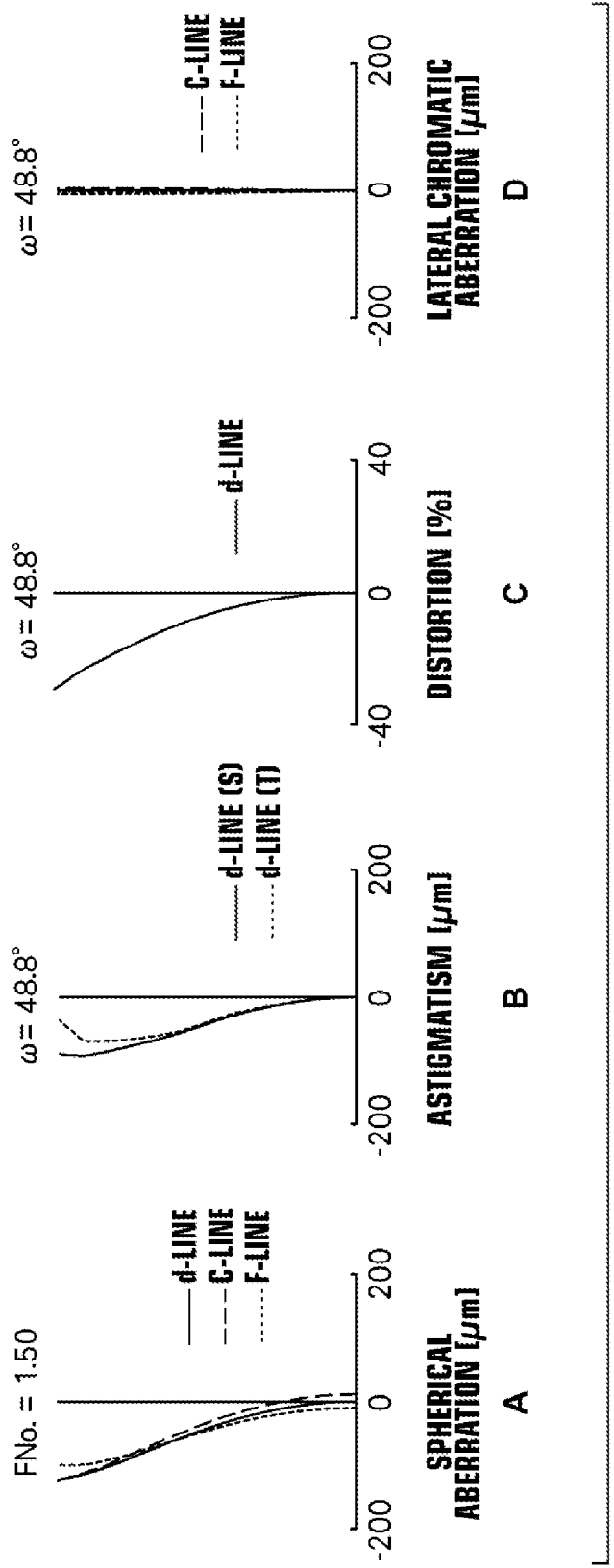

A to D of FIG. 12 are respective aberration diagrams of the imaging lens of Example 6.

Figure 13:
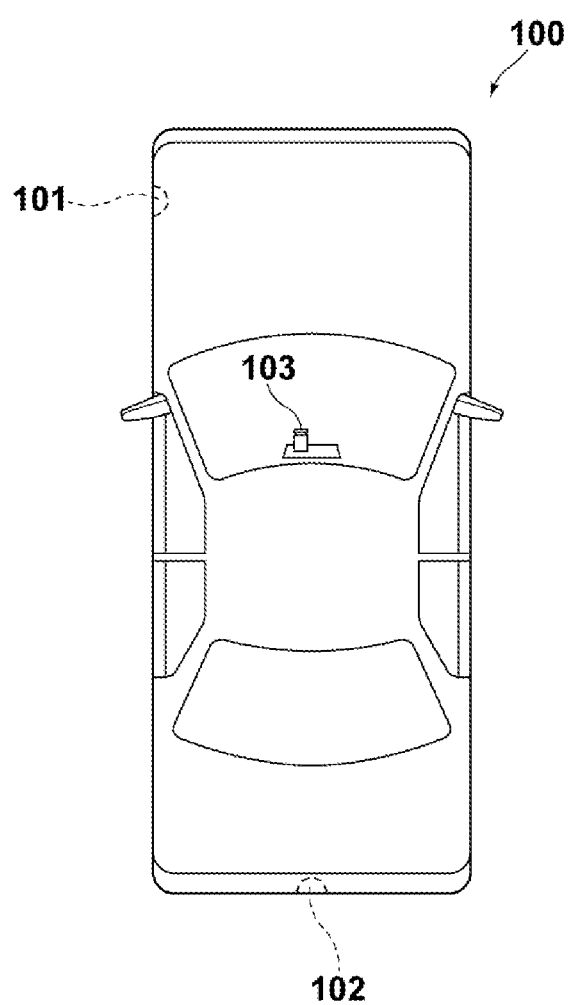

FIG. 13 is a drawing for explaining disposition of vehicle imaging apparatuses according to an embodiment of the present invention.

BEST MODE FOR CARRYING OUT THE INVENTION

Hereinafter, embodiments of the present invention will be described with reference to the accompanying drawings. FIGS. 1 to 6 are cross-sectional views of imaging lenses according to embodiments of the present invention, illustrating configurations thereof, and each corresponding to each of Examples 1 to 6 to be described later. In FIGS. 1 to 6, the left side is the object side and the right side is the image side. As the basic configurations and illustration methods of the examples illustrated in FIGS. 1 to 6 are identical, a description will be made, hereinafter, with reference mainly to the example illustrated in FIG. 1 as a representative.

The imaging lens 1 according to an embodiment of the present invention is a fixed focus optical system and consists of, as lens groups, two lens groups disposed in order from the object side, namely a front group GF and a rear group GR. FIG. 1 illustrates an example in which an aperture stop St is disposed between the front group GF and the rear group GR. Note that the aperture stop St shown in FIG. 1 does not necessarily indicate the size or shape but the position on the optical axis Z.

As it is conceivable that, when the imaging lens is installed in an imaging apparatus, a cover glass for protecting the image sensor, a various types of filters, such as a low-pass filter, an infrared cut filter, and the like are provided according to the specifications of the imaging apparatus, FIG. 1 illustrates an example in which a parallel plate optical member PP assuming these is disposed between the most image side lens surface and the image plane Sim. But the position of the optical member PP is not limited to that shown in FIG. 1 and a configuration without the optical member PP is also possible.

FIG. 1 further illustrates an image sensor 5 disposed on the image plane Sim of the imaging lens 1 in view that the imaging lens 1 is applied to an imaging apparatus. FIG. 1 shows the image sensor 5 in a simplified manner, but in actuality the image sensor 5 is disposed such that the imaging surface thereof corresponds to the image plane Sim. The image sensor 5 captures an optical image formed by the imaging lens 1 and converts the optical image to an electrical signal. For example, a CCD (Charge Coupled Device), a CMOS (Complementary Metal Oxide Semiconductor), or the like may be used as the image sensor 5.

The front group GF may be a lens group having a negative refractive power or a lens group having a positive refractive power. The front group GF is composed of a lens L1 which is a negative meniscus lens with a convex surface on the object side, a lens L2 which is a negative lens, a lens L3 which is a negative lens, and a lens L4 which is a positive lens, in order from the object side. The rear group GR is a lens group having a positive refractive power and is composed of a lens L5 which is a positive lens, a lens L6 which is a negative lens, a lens L7 which is a positive lens, and a lens L8 which is a positive lens, in order from the object side.

Disposition of a negative meniscus lens with a convex surface on the object side is advantageous for increasing the angle of view. The retrofocus type configuration in which the front group GF has a power arrangement of negative, negative, negative, and positive from the object side is advantageous for further increasing the angle of view. In the rear group GR, disposition of two positive lenses on the most image side of the entire system allows the lenses to share the positive refractive power of the rear group GR, which is advantageous for satisfactory correction of spherical aberration. Further, the total number of eight lenses for the entire system allows a compact configuration, yet having a wide angle of view, a small F-number, and high performance to be realized.

Each of the lens L2 and the lens L3 may be a negative meniscus lens with a convex surface on the object side or a biconcave lens. The lens L4 may be a biconvex lens. The lens L5 may be a biconvex lens. The lens L6 may be a biconcave lens. The lens L7 may be a biconvex lens or a positive meniscus lens with a convex surface on the image side. The lens L8 may be a biconvex lens or a positive meniscus lens with a convex surface on the object side. Preferably, the lens L5 and the lens L6 are cemented. If the lens L5 and the lens L6 are cemented, longitudinal chromatic aberration may be corrected satisfactorily without aggravating other aberrations. The lens L3 and the lens L4 may be cemented together or uncemented single lenses.

The imaging lens 1 of the present embodiment is configured to satisfy a conditional expression (1) given below:

$$0.42 < f/f2 < 1.0 \quad (1)$$

where f: focal length of the entire system, and f2: focal length of the rear group.

If the lens system falls to or below the lower limit of the conditional expression (1), it is difficult to realize an optical system having a small F-number. Further, it is difficult to increase the angle of view. If the lens system reaches or exceeds the upper limit of the conditional expression (1), it is difficult to satisfactorily correct spherical aberration. Satisfaction of the conditional expression (1) is advantageous for realizing an optical system having a small F-number and a wide angle of view, with satisfactorily corrected spherical aberration.

In view of the foregoing circumstances, the lens system preferably satisfies a conditional expression (1') given below, and more preferably satisfies a conditional expression (1") given below:

$$0.45<f/f2<1.0 \qquad (1')$$

$$0.5<f/f2<0.8 \qquad (1'').$$

Further, the imaging lens 1 of the present embodiment preferably satisfies a conditional expression (2) given below:

$$0.3<|R6a/f|<1.6 \qquad (2)$$

where

R6a: radius of curvature of the object side surface of the negative lens in the rear group, and f: focal length of the entire system.

If the lens system falls to or below the lower limit of the conditional expression (2), longitudinal chromatic aberration is aggravated. If the lens system reaches or exceeds the upper limit of the conditional expression (2), spherical aberration is aggravated. Satisfaction of the conditional expression (2) is advantageous for satisfactorily correcting longitudinal chromatic aberration and spherical aberration.

In view of the foregoing circumstances, the lens system preferably satisfies a conditional expression (2') given below:

$$0.8<|R6a/f|<1.5 \qquad (2').$$

Still further, the imaging lens 1 of the present embodiment preferably includes an aperture stop St between the front group GF and the rear group GR. Disposition of the aperture stop St further on the front group GF side than between the front group GF and the rear group GR is disadvantageous for increasing the angle of view, while disposition of the aperture stop St further on the rear group GR side than between the front group GF and the rear group GR causes the outer diameter of the lens L1 to be increased, which is against downsizing.

Further, disposition of the aperture stop St between the front group GF and the rear group GR results in that the aperture stop is located near the middle of the lens system, whereby the ray heights at the most object side lens and the most image side lens where ray heights tend to increase may be suppressed and the lens diameter may be reduced. In addition, as the positive lens L5 comes immediately following the aperture stop St, the convergence effects may be applied to the light beam passing through the aperture stop St and being apt to spreading, which is advantageous for downsizing.

If the aperture stop St is disposed between the front group GF and the rear group GR, the lens system preferably satisfies a conditional expression (3) given below:

$$1.0<Dab/f<5.1 \qquad (3)$$

where

Dab: distance on the optical axis between the most object side lens surface in the front group to the most object side lens surface in the rear group, and f: focal length of the entire system.

If the lens system falls to or below the lower limit of the conditional expression (3), lateral chromatic aberration is aggravated. If the lens system reaches or exceeds the upper limit of the conditional expression (3), the overall length of the lens system is increased or satisfactory correction of spherical aberration is difficult. Satisfaction of the conditional expression (3) is advantageous for satisfactory correction of lateral chromatic aberration and spherical aberration, or for satisfactory correction of lateral chromatic aberration and downsizing.

In view of the foregoing circumstances, the lens system preferably satisfies a conditional expression (3') given below:

$$3.0<Dab/f<4.9 \qquad (3').$$

Still further, the imaging lens 1 of the present embodiment preferably satisfies a conditional expression (4) given below:

$$-0.065<f/f1<0.10 \qquad (4)$$

where f: focal length of the entire system, and f1: focal length of the front group.

If the lens system falls to or below the lower limit of the conditional expression (4), the overall length of the lens system is increased. If the lens system reaches or exceeds the upper limit of the conditional expression (4), it is difficult to increase the angle of view. Satisfaction of the conditional expression (4) is advantageous for configuring the lens system to have a wide angle of view while suppressing the overall length.

In view of the foregoing circumstances, the lens system preferably satisfies a conditional expression (4') given below:

$$-0.02<f/f1<0.02 \qquad (4').$$

The foregoing preferable configurations may be combined in any manner and are preferably employed selectively, as appropriate, according to the specifications required of the imaging lens. The imaging lens of the present embodiment is applicable, for example, to an optical system having an F-number less than or equal to 1.6 and a total angle of view of 95 degrees or more, and appropriate employment of preferable configurations allows better optical performance.

Next, numerical examples of the imaging lens of the present invention will be described.

Example 1

The lens cross-section view of the imaging lens of Example 1 is as illustrated in FIG. 1. As the illustration method is as described above, duplicated description will be omitted here.

The schematic configuration of the imaging lens of Example 1 is as follows. That is, the imaging lens consists of a front group GF having a negative refractive power, an aperture stop St, and a rear group GR having a positive refractive power, in order from the object side. The front group GF is composed of 4 lenses: a lens L1 having a negative meniscus shape with a convex surface on the object side; a lens L2 having a negative meniscus shape with a convex surface on the object side; a lens L3 having a biconcave shape; and a lens L4 having a biconvex shape, in order from the object side. The rear group GR is composed of 4 lenses: a lens L5 having a biconvex shape; a lens L6 having a biconcave shape; a lens L7 having a biconvex shape, and a lens L8 having a biconvex shape, in order from the object side. The lens L5 and the lens L6 are cemented, and all the other lenses are uncemented single lenses. The lenses L1 to L8 are all spherical lenses.

As a detailed configuration of the image lens of Example 1, Table 1 shows the lens data thereof. The symbols f, Bf, FNo, and 2ω in the upper margin of Table 1 represent the focal length of the entire system, the back focus (in terms of air equivalent distance), the F-number, and the maximum total angle of view respectively, all the values of which are with respect to the d-line.

The Si column within the frame of Table 1 indicates the $i^{th}$ surface number in which a number i (i=1, 2, 3, - - -) is given to each surface in a serially increasing manner toward the image side with the object side surface of the most object side constituent element being taken as the first surface. The Ri column indicates the radius of curvature of the $i^{th}$ surface. The sign of the radius of curvature is positive if the surface shape is convex on the object side and negative if it is convex on the image side. The Di column indicates the surface distance on the optical axis Z between the $i^{th}$ surface and the $(i+1)^{th}$ surface. The bottom of the Di column indicates the surface distance between the most image side surface shown in Table 1 and the image plane Sim.

In Table 1, the Ndj column indicates the refractive index of the $j^{th}$ optical element with respect to the d-line (wavelength of 587.56 nm) in which a number j (j=1, 2, 3, - - -) is given to each constituent element in a serially increasing manner toward the image side with the most object side constituent element being taken as the first element, and the vdj column indicates the Abbe number of the $j^{th}$ optical element with respect to the d-line. Note that the aperture stop St and the optical member PP are also included in the lens data, and the surface number column corresponding to the aperture stop St includes the word (St) in addition to the surface number.

In each table shown below, "degree" is used as the unit of angle, and "mm" is used as the unit of length. But, these are only examples and other appropriate units may also be used, as optical systems can be used by proportionally enlarged or reduced. Further, each table shown below indicates values rounded to a predetermined digit.

TABLE 1

Example 1 Lens Data
f = 4.97, Bf = 7.76, FNo. = 1.60, 2ω = 97.0°

| Si | Ri | Di | Ndj | vdj |
|---|---|---|---|---|
| 1 | 12.7043 | 1.20 | 1.48749 | 70.23 |
| 2 | 9.0822 | 4.72 | | |
| 3 | 14.6113 | 1.96 | 1.48749 | 70.23 |
| 4 | 5.9259 | 4.36 | | |
| 5 | −226.2130 | 0.62 | 1.60300 | 65.44 |
| 6 | 9.1279 | 3.97 | | |
| 7 | 13.5215 | 3.00 | 1.84666 | 23.88 |
| 8 | −56.6575 | 2.00 | | |
| 9 (St) | ∞ | 2.16 | | |
| 10 | 28.2334 | 3.00 | 1.69680 | 55.53 |
| 11 | −5.4590 | 0.54 | 1.84666 | 23.88 |
| 12 | 19.3219 | 1.28 | | |
| 13 | 165.8198 | 0.86 | 1.83481 | 42.71 |
| 14 | −11.8293 | 0.80 | | |
| 15 | 12.7640 | 4.00 | 1.83481 | 42.71 |
| 16 | −209.1689 | 0.67 | | |
| 17 | ∞ | 1.06 | 1.51633 | 64.14 |
| 18 | ∞ | 9.74 | | |

A to D of FIG. 7 are respective aberration diagrams of the imaging lens of Example 1, illustrating spherical aberration, astigmatism, distortion, and lateral chromatic aberration respectively. The "FNo." in the spherical aberration diagram indicates the F-number, and "ω" in the other aberration diagrams indicates the half angle of view. Each aberration diagram illustrates aberration with the d-line (wavelength 587.56 nm) as the reference wavelength. But the spherical aberration diagram also indicates aberrations with respect to the C-line (wavelength 656.27 nm) and the F-line (wavelength 486.13 nm), and the lateral chromatic aberration diagram illustrates aberrations with respect to the C-line and the F-line. In the astigmatism diagram, astigmatism in the sagittal direction is indicated by a solid line and astigmatism in the tangential direction is indicated by a dotted line, and the notes of the line types include symbols (S) and (T) respectively. A to D of FIG. 7 are those when the object distance is infinity.

The illustration method, and symbols in each table, their meanings, representation method, and the like described in Example 1 are applied also to the following examples unless otherwise specifically described, and duplicated description will be omitted herein below. In the lens cross-sectional views of examples below, the symbols 1, R6a, and Dab are omitted.

Example 2

The lens cross-sectional view of the imaging lens of Example 2 is as illustrated in FIG. 2. The schematic configuration of the imaging lens of Example 2 is identical to that of Example 1. Table 2 shows lens data of the imaging lens of Example 2. A to D of FIG. 8 are respective aberration diagrams of the imaging lens of Example 2.

TABLE 2

Example 2 Lens Data
f = 5.03, Bf = 6.94, FNo. = 1.60, 2ω = 97.0°

| Si | Ri | Di | Ndj | vdj |
|---|---|---|---|---|
| 1 | 23.0909 | 1.00 | 1.49700 | 81.54 |
| 2 | 7.2439 | 2.64 | | |
| 3 | 6.5196 | 2.51 | 1.62004 | 36.26 |
| 4 | 5.5091 | 4.29 | | |
| 5 | −62.6665 | 4.19 | 1.60300 | 65.44 |
| 6 | 8.8919 | 1.40 | | |
| 7 | 20.7412 | 3.00 | 1.85026 | 32.27 |
| 8 | −16.8303 | 2.00 | | |
| 9 (St) | ∞ | 3.17 | | |
| 10 | 34.6430 | 3.00 | 1.83481 | 42.73 |
| 11 | −5.5866 | 0.30 | 1.84666 | 23.78 |
| 12 | 18.4916 | 1.37 | | |
| 13 | 211.2525 | 1.90 | 1.83481 | 42.73 |
| 14 | −13.4031 | 0.80 | | |
| 15 | 13.0783 | 4.00 | 1.83481 | 42.73 |
| 16 | −217.4828 | 0.67 | | |
| 17 | ∞ | 1.06 | 1.51633 | 64.14 |
| 18 | ∞ | 8.92 | | |

Example 3

The lens cross-sectional view of the imaging lens of Example 3 is as illustrated in FIG. 3. The schematic configuration of the imaging lens of Example 3 is identical to that of Example 1, other than that the lens L3 has a negative meniscus shape with a convex surface on the object side and the lens L7 has a positive meniscus shape with a convex surface on the image side. Table 3 shows lens data of the imaging lens of Example 3. A to D of FIG. 9 are respective aberration diagrams of the imaging lens of Example 3.

TABLE 3

Example 3 Lens Data
f = 4.99, Bf = 5.89, FNo. = 1.60, 2ω = 96.2°

| Si | Ri | Di | Ndj | vdj |
|---|---|---|---|---|
| 1 | 17.4933 | 1.20 | 1.49700 | 81.54 |
| 2 | 7.7160 | 1.43 | | |
| 3 | 6.9186 | 2.84 | 1.84666 | 23.88 |
| 4 | 5.3815 | 4.67 | | |
| 5 | 421.8504 | 4.05 | 1.51742 | 52.43 |

TABLE 3-continued

Example 3 Lens Data
f = 4.99, Bf = 5.89, FNo. = 1.60, 2ω = 96.2°

| Si | Ri | Di | Ndj | vdj |
|---|---|---|---|---|
| 6 | 6.2057 | 1.42 | | |
| 7 | 13.0509 | 3.00 | 1.84666 | 23.88 |
| 8 | −24.3056 | 1.11 | | |
| 9 (St) | ∞ | 0.80 | | |
| 10 | 28.2334 | 2.32 | 1.80400 | 46.58 |
| 11 | −4.3799 | 0.30 | 1.84666 | 23.88 |
| 12 | 14.6644 | 1.38 | | |
| 13 | −130.6139 | 1.92 | 1.83481 | 42.73 |
| 14 | −9.3501 | 0.80 | | |
| 15 | 12.5845 | 4.00 | 1.83481 | 42.73 |
| 16 | −54.7538 | 0.67 | | |
| 17 | ∞ | 1.06 | 1.51633 | 64.14 |
| 18 | ∞ | 4.52 | | |

Example 4

The lens cross-sectional view of the imaging lens of Example 4 is as illustrated in FIG. 4. The schematic configuration of the imaging lens of Example 4 is identical to that of Example 1, other than that the lens L2 has a biconcave shape, the lens L3 has a negative meniscus shape with a convex surface on the object side, the lens L8 has a positive meniscus shape with a convex surface on the object side, and the lens L3 and the lens L4 are cemented. Table 4 shows lens data of the imaging lens of Example 4. A to D of FIG. 10 are respective aberration diagrams of the imaging lens of Example 4.

TABLE 4

Example 4 Lens Data
f = 4.99, Bf = 6.40, FNo. = 1.50, 2ω = 97.8°

| Si | Ri | Di | Ndj | vdj |
|---|---|---|---|---|
| 1 | 12.4395 | 3.15 | 1.83481 | 42.73 |
| 2 | 6.2769 | 4.50 | | |
| 3 | −16.3921 | 0.60 | 1.48749 | 70.23 |
| 4 | 7.1113 | 1.21 | | |
| 5 | 28.6990 | 4.66 | 1.77250 | 49.60 |
| 6 | 5.8863 | 5.00 | 1.83481 | 42.73 |
| 7 | −15.3433 | 3.00 | | |
| 8 (St) | ∞ | 0.80 | | |
| 9 | 10.9071 | 4.03 | 1.65160 | 58.55 |
| 10 | −7.1973 | 2.00 | 1.78472 | 25.68 |
| 11 | 12.0199 | 0.91 | | |
| 12 | 42.1911 | 1.50 | 1.83481 | 42.73 |
| 13 | −14.4470 | 0.30 | | |
| 14 | 11.0277 | 2.34 | 1.77250 | 49.60 |
| 15 | 66.0318 | 2.00 | | |
| 16 | ∞ | 1.00 | 1.51633 | 64.14 |
| 17 | ∞ | 3.74 | | |

Example 5

The lens cross-sectional view of the imaging lens of Example 5 is as illustrated in FIG. 5. The schematic configuration of the imaging lens of Example 5 is identical to that of Example 4, other than that the front group GF has a positive refractive power. Table 5 shows lens data of the imaging lens of Example 5. A to D of FIG. 11 are respective aberration diagrams of the imaging lens of Example 5.

TABLE 5

Example 5 Lens Data
f = 5.10, Bf = 5.23, FNo. = 1.50, 2ω = 97.8°

| Si | Ri | Di | Ndj | vdj |
|---|---|---|---|---|
| 1 | 10.8190 | 3.00 | 1.83481 | 42.73 |
| 2 | 5.7992 | 4.50 | | |
| 3 | −19.4541 | 0.60 | 1.57250 | 57.74 |
| 4 | 6.4504 | 1.35 | | |
| 5 | 13.7381 | 1.32 | 1.72916 | 54.68 |
| 6 | 5.3667 | 5.00 | 1.83481 | 42.73 |
| 7 | −17.3590 | 3.00 | | |
| 8 (St) | ∞ | 0.80 | | |
| 9 | 12.0946 | 3.85 | 1.64000 | 60.08 |
| 10 | −5.0161 | 0.80 | 1.76182 | 26.52 |
| 11 | 15.0217 | 0.78 | | |
| 12 | 50.3132 | 1.50 | 1.83481 | 42.73 |
| 13 | −10.9018 | 0.30 | | |
| 14 | 9.0868 | 2.87 | 1.83481 | 42.73 |
| 15 | 17.6262 | 2.00 | | |
| 16 | ∞ | 1.00 | 1.51633 | 64.14 |
| 17 | ∞ | 2.57 | | |

Example 6

The lens cross-sectional view of the imaging lens of Example 6 is as illustrated in FIG. 6. The schematic configuration of the imaging lens of Example 6 is identical to that of Example 4. Table 6 shows lens data of the imaging lens of Example 6. A to D of FIG. 12 are respective aberration diagrams of the imaging lens of Example 6.

TABLE 6

Example 6 Lens Data
f = 5.09, Bf = 5.32, FNo. = 1.50, 2ω = 97.6°

| Si | Ri | Di | Ndj | vdj |
|---|---|---|---|---|
| 1 | 13.3302 | 2.54 | 1.61800 | 63.33 |
| 2 | 5.8284 | 4.50 | | |
| 3 | −12.4616 | 0.60 | 1.49700 | 81.54 |
| 4 | 7.1011 | 1.54 | | |
| 5 | 23.6311 | 1.00 | 1.53172 | 48.84 |
| 6 | 7.2656 | 5.00 | 1.77250 | 49.60 |
| 7 | −14.8231 | 3.00 | | |
| 8 (St) | ∞ | 0.80 | | |
| 9 | 8.8937 | 4.31 | 1.60300 | 65.44 |
| 10 | −6.0654 | 0.80 | 1.80000 | 29.84 |
| 11 | 11.5801 | 0.91 | | |
| 12 | 66.9201 | 1.50 | 1.80400 | 46.58 |
| 13 | −10.7788 | 0.30 | | |
| 14 | 9.6737 | 3.49 | 1.69680 | 55.53 |
| 15 | 49.3072 | 2.00 | | |
| 16 | ∞ | 1.00 | 1.51633 | 64.14 |
| 17 | ∞ | 2.66 | | |

Table 7 summarizes values corresponding to the conditional expressions (1) to (4) for each of Examples 1 to 6. The values shown in Table 7 are those based on the d-line.

TABLE 7

| Conditional Expression | | Example 1 | Example 2 | Example 3 | Example 4 | Example 5 | Example 6 |
|---|---|---|---|---|---|---|---|
| (1) | f/f2 | 0.51 | 0.55 | 0.65 | 0.51 | 0.60 | 0.54 |
| (2) | |R6a/f| | 1.10 | 1.11 | 0.88 | 1.45 | 0.98 | 1.19 |

TABLE 7-continued

| Conditional Expression | | Example 1 | Example 2 | Example 3 | Example 4 | Example 5 | Example 6 |
|---|---|---|---|---|---|---|---|
| (3) | Dab/f | 4.83 | 4.82 | 4.12 | 4.60 | 3.84 | 3.73 |
| (4) | f/f1 | −0.015 | −0.022 | −0.012 | −0.006 | 0.004 | −0.001 |

As is known from the foregoing data, each of the imaging lenses of Examples 1 to 6 has a small F-number of 1.5 to 1.6, achieved a wide total angle of view of 96° or more, and has high optical performance with various types of aberrations being corrected satisfactorily, as well as compact with 8 lenses and can be produced inexpensively since all lens surfaces are spherical.

As a usage example, FIG. 13 illustrates imaging apparatuses, each having the imaging lens of the present embodiment, installed in a car 100. In FIG. 13, the car 100 is equipped with a vehicle exterior camera 101 for imaging a side dead area on the passenger side, a vehicle exterior camera 102 for imaging a rear dead area of the car 100, and a vehicle interior camera 103 fixed on the rear surface of the rearview mirror to perform imaging the same field of view range as that of the driver. Each of the vehicle exterior camera 101, the vehicle exterior camera 102, and the vehicle interior camera 103 is an imaging apparatus according to an embodiment of the present invention and includes the imaging lens according to an embodiment of the present invention and an image sensor that converts an optical image formed by the imaging lens to an electrical signal.

So far, the present invention has been described by way of embodiments and Examples, but it should be understood that the present invention is not limited to the embodiments and Examples described above, and various changes and modifications may be made. For example, values of radius of curvature, surface distance, refractive index, and Abbe number of each lens, and the like are not limited to those shown in each numerical example, and may take other values.

Further, in the embodiment of the imaging apparatus, the description has been made of a case in which the present invention is applied to vehicle cameras with reference to a drawing, but the present invention is not limited to this application, and the present invention is applicable to, for example, broadcasting cameras, surveillance cameras, digital cameras, and is favorably usable, in particular, as an interchangeable lens of digital cameras.

What is claimed is:

1. An imaging lens, consisting essentially of a front group and a rear group in order from the object side, wherein:
the front group consists essentially of a negative meniscus lens with a convex surface on the object side, a negative lens, a negative lens, and a positive lens in order from the object side;
the rear group consists essentially of a positive lens, a negative lens, a positive lens, and a positive lens in order from the object side; and
the imaging lens satisfies conditional expressions (1) and (4) given below:

$$0.42 < f/f2 < 1.0 \quad (1), \text{ and}$$

$$-0.065 < f/f1 < 0.10 \quad (4)$$

where
f: focal length of the entire system,
f1: focal length of the front group, and
f2: focal length of the rear group.

2. The imaging lens as claimed in claim 1, wherein the imaging lens satisfies a conditional expression (1') given below:

$$0.45 < f/f2 < 1.0 \quad (1').$$

3. The imaging lens as claimed in claim 1, wherein the imaging lens satisfies a conditional expression (2) given below:

$$0.3 < |R6a/f| < 1.6 \quad (2)$$

where
R6a: radius of curvature of the object side surface of the negative lens in the rear group.

4. The imaging lens as claimed in claim 1, wherein a stop is provided between the front group and the rear group.

5. The imaging lens as claimed in claim 4, wherein the imaging lens satisfies a conditional expression (3) given below:

$$1.0 < Dab/f < 5.1 \quad (3)$$

where
Dab: distance on the optical axis between the most object side lens surface in the front group to the most object side lens surface in the rear group.

6. The imaging lens as claimed in claim 1, wherein the imaging lens satisfies a conditional expression (1") given below:

$$0.5 < f/f2 < 0.8 \quad (1").$$

7. The imaging lens as claimed in claim 3, wherein the imaging lens satisfies a conditional expression (2') given below:

$$0.8 < |R6a/f| < 1.5 \quad (2').$$

8. The imaging lens as claimed in claim 5, wherein the imaging lens satisfies a conditional expression (3') given below:

$$3.0 < Dab/f < 4.9 \quad (3').$$

9. The imaging lens as claimed in claim 1, wherein the imaging lens satisfies a conditional expression (4') given below:

$$-0.02 < f/f1 < 0.02 \quad (4').$$

10. An imaging apparatus equipped with the imaging lens as claimed in claim 1.

* * * * *